(12) United States Patent
Kraeling et al.

(10) Patent No.: US 8,190,315 B2
(45) Date of Patent: May 29, 2012

(54) SYSTEM, METHOD AND COMPUTER READABLE MEDIA FOR OPERATING A DISTRIBUTED POWER TRAIN

(75) Inventors: Mark Bradshaw Kraeling, Melbourne, FL (US); Robert James Foy, III, Melbourne, FL (US); John William Brand, Melbourne, FL (US)

(73) Assignee: General Electric Company, Schenectady, NY (US)

( * ) Notice: Subject to any disclaimer, the term of this patent is extended or adjusted under 35 U.S.C. 154(b) by 846 days.

(21) Appl. No.: 12/194,779

(22) Filed: Aug. 20, 2008

(65) Prior Publication Data

US 2010/0049384 A1 Feb. 25, 2010

(51) Int. Cl.
*G05D 1/00* (2006.01)
(52) U.S. Cl. ............ 701/20; 701/19; 701/96; 246/182 R
(58) Field of Classification Search .................. 701/1, 2, 701/19, 20, 23, 25, 26, 36, 93, 96; 246/182 R, 246/182 A, 182 B, 182 C, 187 A, 187 C
See application file for complete search history.

(56) References Cited

U.S. PATENT DOCUMENTS

| | | | |
|---|---|---|---|
| 6,401,015 B1 | 6/2002 | Stewart et al. | |
| 6,580,976 B1 * | 6/2003 | Belcea | 701/20 |
| 6,759,951 B2 | 7/2004 | Kellner et al. | |
| 6,862,502 B2 | 3/2005 | Peltz et al. | |
| 7,395,141 B1 * | 7/2008 | Seck et al. | 701/19 |
| 2005/0010338 A1 * | 1/2005 | Kraeling et al. | 701/19 |
| 2007/0027583 A1 * | 2/2007 | Tamir et al. | 701/1 |
| 2008/0167774 A1 * | 7/2008 | Patel et al. | 701/36 |
| 2008/0312775 A1 * | 12/2008 | Kumar | 701/2 |

* cited by examiner

*Primary Examiner* — S. Joseph Morano
*Assistant Examiner* — Zachary Kuhfuss
(74) *Attorney, Agent, or Firm* — GE Global Patent Operation; John A. Kramer

(57) ABSTRACT

An embodiment of the invention for conducting a distributed power train operation, comprises a controller at the remote unit for issuing commands to control the operation of the remote unit on a track, and responsive to a communication loss between the lead unit and the remote unit. A memory, accessible by the controller, comprises data relative to a track profile including a plurality of geographical coordinates of the track and data relative to one or more throttle positions or braking operations for the remote unit that are associated with the geographical coordinates. The controller receives data relative to geographical coordinates of the remote unit and upon a detection of the communication loss, the controller compares the geographical coordinates of the remote unit to the track profile geographical coordinates and issues one more commands associated with the operation of the remote unit.

27 Claims, 2 Drawing Sheets

APPENDIX D

SYSTEM, METHOD AND COMPUTER READABLE MEDIA FOR OPERATING A DISTRIBUTED POWER TRAIN

BACKGROUND OF THE INVENTION

This invention relates generally to the field of locomotive control, and more particularly to controlling an operation of a remote locomotive in a distributed power train having a communication system for transmission of communication signals between a lead locomotive and a remote locomotive.

Distributed power train operation supplies motive power from a lead locomotive and one or more remote locomotives spaced apart from the lead locomotive in a train consist. Each lead and remote locomotive includes an air brake control system for controlling braking operations and a communication system for exchanging information between lead and remote locomotives over a communication link. Distributed power train operation may be preferable for long train consists to improve train handling and performance, especially for trains operating over mountainous terrain.

A distributed power train control and communications system generates traction and braking commands responsive to operator-initiated control of a traction (or throttle) controller (throttle handle) or a braking controller (brake handle) in the lead unit. The commands are transmitted to the remote locomotives over a radio frequency communications system (such as the LOCOTROL® distributed power train communications system available from the General Electric Company of Schenectady, N.Y.) including receiving and transmitting components at the lead and the remote units for communicating over a radio frequency link (channel).

For example, when the lead unit operator operates the lead-unit throttle controller to apply tractive effort from the lead unit, the distributed power control and communications system commands each remote unit to supply the same tractive effort. Upon execution of the received command, each remote unit responds to the lead unit with a reply message indicating implementation of the tractive effort command. The distributed power control and communications system can be configured to various operational modes that affect interaction between the lead and remote units and the implementation of lead unit commands at the remote unit.

The lead unit also sends other message types to the remote units, such as status request messages, to which the remote units respond by sending a status reply message back to the lead unit. The status reply message indicates the current operational status of the replying remote unit. Messages from the lead locomotive to the remove units and vise versa are typically sent at predetermined time intervals, for example every twenty seconds. If the communications system is inoperative or the communications link between the lead unit and one or more remote units is disrupted (for example, if line-of-sight directivity is lost due to track topology or an interfering object), lead initiated braking and traction commands are not received by the remote unit(s). In particular, if the lead operator commands an increase in tractive effort because the train is climbing a hill, the remote units will not receive the tractive effort command.

Currently, when a remote unit determines there is a communication loss, the remote unit initiates an algorithm to progressively lower the tractive effort to a presumably safe speed. However, reducing the tractive effort at the remote in such a scenario may increase the load requirements of the lead unit slowing the train as it attempts to climb the hill. In addition, the train speed is reduced, which may effect whether the train is able to meet a trip schedule. In a worst case scenario, the reduction in tractive effort at the remote may generate sufficient in-train forces that can break the train and/or cause a train derailment.

BRIEF DESCRIPTION OF THE INVENTION

A distributed power train comprises a lead unit, a remote unit, a plurality of railcars and a communications system that transmits information signals between the lead unit and remote unit. The lead unit is controlled by operation of lead unit controls, and the remote unit is controlled by commands issued from the lead unit to the remote unit over the communication system. An embodiment of the invention for conducting a distributed power train operation, comprises a controller at the remote unit for issuing commands to control the operation of the remote unit on a track and responsive to a communication loss between the lead unit and the remote unit. A memory, accessible by the controller, comprises data relative to a track profile including a plurality of geographical coordinates of the track and data relative to one or more throttle positions or braking operations for the remote unit that are associated with the geographical coordinates. The controller receives data relative to geographical coordinates of the remote unit and upon a detection of the communication loss between the remote unit and lead unit, the controller compares the geographical coordinates of the remote unit to the track profile geographical coordinates and issues one more throttle position or braking operation commands associated with the remote unit and track profile geographical coordinate data to control the movement of the remote unit on the track during the communication loss.

A method for conducting a distributed power train operation comprise storing in a memory, at the remote unit, track profile data comprising a plurality of geographical coordinates of a track on which the remote unit travels and data relative to one or more throttle positions or braking operations for the remote unit associated with the track profile geographical coordinates. In addition the method comprises storing in a memory, at the remote unit, data relative to geographical coordinates of the remote unit as the remote unit is moving on the track; determining at the remote unit that there exists a communications loss between the lead unit and the remote unit while moving on a track;

And, identifying, at the remote unit, the track profile geographic coordinate data and the associated throttle position or braking operation data that are associated with the geographic coordinates of the remote unit. Responsive to identifying the associated throttle position or braking operation data, the method further comprises issuing, at the remote unit, one or more commands to control movement of the remote unit during the communication loss.

BRIEF DESCRIPTION OF THE DRAWINGS

The present invention can be more easily understood and the further advantages and uses thereof more readily apparent, when considered in view of the following detailed description when read in conjunction with the following figures, wherein.

In accordance with common practice, the various described features are not drawn to scale, but are drawn to emphasize specific features relevant to the embodiments of the invention. Reference characters denote like elements throughout the figures and text.

DETAILED DESCRIPTION OF THE INVENTION

Figure 1:
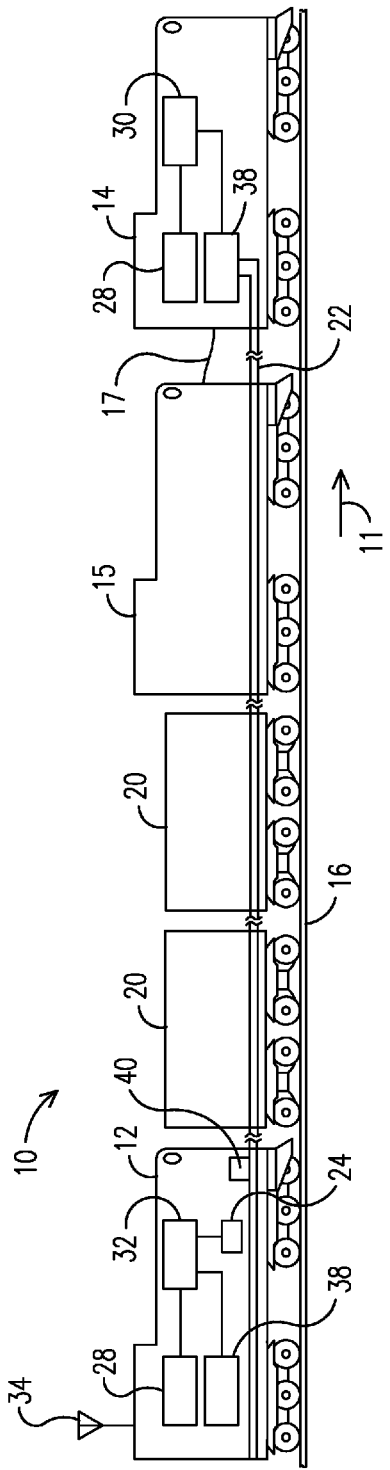
FIG. 1 is a schematic diagram of a distributed power railroad train.

A more particular description of the invention briefly described above will be rendered by reference to specific embodiments thereof that are illustrated in the appended drawings. Understanding that these drawings depict only typical embodiments of the invention and are not therefore to be considered to be limiting of its scope, the invention will be described and explained. Before describing in detail the particular method and apparatus for controlling of movement of a train in accordance with the present invention, it should be observed that the present invention resides primarily in a novel combination of hardware and software elements related to said method and apparatus. Accordingly, the hardware and software elements have been represented by conventional elements in the drawings, showing only those specific details that are pertinent to the present invention, so as not to obscure the disclosure with structural details that will be readily apparent to those skilled in the art having the benefit of the description herein.

Throughout the description of the embodiments of the invention, the terms "radio link," "RF (radio frequency) link" and "RF communications" and similar terms describe a method of communicating between two links in a network, such as a lead and a remote locomotive of a distributed power train. It should be understood that the communications link between nodes (locomotives) in the system is not limited to radio or RF systems or the like and is meant to cover all techniques by which messages may be delivered from one node to another or to plural others, including without limitation, magnetic systems, acoustic systems and optical systems. Likewise, the invention is not limited to a described embodiment in which RF links are used between nodes and in which the various components are compatible with such links. In addition, the term "geographic coordinates" as used herein is intended to include the use of any means of indication of a location of an article, which may include the longitudinal and/or latitudinal readings, or elevation readings; the term is also intended to encompass identifying the location of an article in terms of the distance the remote unit is from one or fixed reference points such as a start location of destination of a trip plan, or the distance the remote unit is spaced from a wayside traffic control device such as mile marker or a switch.

FIG. 1 schematically illustrates a distributed power train 10 in accordance with an embodiment of the invention. The train 10, traveling in a direction indicated by an arrow 11, includes a lead unit 14 and one or more remote units. The illustrated exemplary train 10 includes the remote unit 12 controlled from the lead unit 14. The distributed power train 10 further includes a plurality of railcars 20 between the lead unit 14 and the remote unit 12. The arrangement of the lead locomotive 14, the remote locomotive 12 and railcars 20 illustrated in FIG. 1 is merely exemplary, as embodiments of the invention can be applied to other locomotive/railcar arrangements. For example, there may be other remote units between the remote unit 12, the railcars 20 and the lead unit 14. Each railcar 20 includes an air brake system (not shown) that applies the railcar air brakes in response to a pressure drop in a brake pipe 22, and releases the air brakes responsive to a pressure rise in the brake pipe 22. The brake pipe 22 runs the length of the train for conveying the air pressure changes specified by the individual braking controller (not shown) in the lead unit 14 and the remote units 12.

The lead unit 14 includes a lead controller 30 and a radio frequency module 28 for generating and issuing commands and messages from the lead unit 14 to the remote unit 12, and for receiving reply messages there from. Commands are generated at the lead controller 30 in response to operator control of the traction controller (throttle) and in response to operator control of the lead braking controller within the lead unit 14.

The remote unit 12 includes a remote controller 32 and remote communications module 28, for processing and responding to transmissions from the lead unit 14 transmitted over the communications link (e.g., by applying tractive effort or brakes at the receiving remote unit) and for issuing reply messages (e.g., acknowledging receipt and implementation of a lead unit command) and status messages back to the lead unit 14.

For example, when the lead unit operator operates a lead-unit throttle handle to apply tractive effort from the lead unit 14, the distributed power control and communications system commands the remote unit 12 to supply the same tractive effort. Upon execution of the received command, the remote unit 12 responds to the lead unit 14 with a status command indicating implementation of the tractive effort command. The distributed power control system can be configured to various operational modes that control interaction between the lead and remote unit and implementation of lead unit commands at the remote unit.

In one embodiment, the communications channel of the communications system includes a single half-duplex communications channel having a 3 kHz bandwidth. The messages and commands include a serial binary data stream modulating one of four available carrier frequencies using frequency shift keying modulation. The various bit patterns convey information including the type of transmission (e.g., message, command, alarm); the substantive message, command or alarm; the address of the receiving unit; the address of the sending unit; conventional start and stop bits and/or error detection/correction bits. The messages allow control of the remote unit 12 from the lead unit 14 and provide remote unit operating information back to the lead unit 14. The details of the system messages and commands and the transmission format of individual messages and commands are described in detail in commonly-owned U.S. Pat. No. 4,582,280.

Each message and command sent from the lead unit 14 is broadcast to the remote unit 12 and includes a lead unit identifier for use by the remote unit 12 to determine whether the sending lead unit is the lead unit of the same train. An affirmative determination causes the remote unit 12 to execute the received command. Messages and alarms sent from the remote unit 12 also include the sending unit's address. The receiving unit, i.e., the lead locomotive or another remote locomotive, can determine whether it is an intended recipient of the received transmission by checking the sending unit's identification in the message, and can then respond accordingly.

Each locomotive 14 and 12 further includes a dynamic brake controller 38. Application of the dynamic brakes in the lead locomotive 14 generates a signal communicated to the remote unit 12 over the communications link. Responsive thereto, the remote controller 32 controls the dynamic brake controller 38 of the remote unit 12 to activate dynamic braking. Generally, application of the dynamic brakes generates relatively uniform braking forces throughout the length of the train.

As the distributed power train 10 passes through certain terrain topographies or track segments with proximate natural or man-made obstructions, a line-of-sight communications link between the sending and one or more of the receiving units may be interrupted. Thus, commands from the lead unit 14 to the remote unit 12 and status messages from the remote unit 12 to the lead unit 14 may not be reliably received. Although high-power, robust transceivers may be capable of successfully transmitting the signal to the receiving unit under certain operating conditions, such equipment can be relatively expensive. Further, in some operating scenarios even a high-power transceiver cannot successfully effect communications, such as when a long train travels a curved track segment adjacent a natural obstruction such as a mountain, where the communications path between the lead unit and one or more remote units is obstructed by the mountain. In addition, as the train 10 passes through a tunnel certain transceivers may be unable to communicate with other transceivers aboard the locomotives. Thus, operation of the distributed power communications system may be interrupted for short periods during train operation.

A communications system for a distributed power train typically transmits signals at a predetermined time interval (for example every twenty seconds) to verify that a communication link between the lead unit and remote unit is active. If a signal or transmission has not been received at the remote unit from the lead for a second predetermined time (for example, one minute), the controller on the remote unit issues one or more commands to control operation of the remote unit. For example, if the remote unit is applying a tractive effort at the time of a communications loss, the controller on the remote unit will command the remote unit to change the throttle position to reduce the tractive effort. If there is a communication loss during a braking application, the remote unit maintains the last received dynamic brake command.

In an embodiment of the present invention, the controller 32 on the remote unit 12 is programmed or comprises algorithms to predict the throttle setting that the remote unit 12 should be traveling given the current track conditions and the location of the remote unit 12 on the track 16. The remote unit 12 is equipped with a GPS transceiver 34 that transmits data relative to the geographic coordinates of the remote unit 12 to the controller 32. In addition, the controller 32 has data stored in a memory relative to a track profile for the track 16 on which the remote unit 12 is traveling. The track profile data may include information or data pertaining to a plurality of geographic coordinates or one or more ranges of geographical coordinates plotted along the track 16, and the database may also include data relative to the track grade associated the geographical coordinates. In addition, the database or memory may comprise data relative to one or more notch or throttle positions for the remote unit 12 that are associated with each geographical coordinate or range of geographical coordinates for the track 16.

Figure 2:
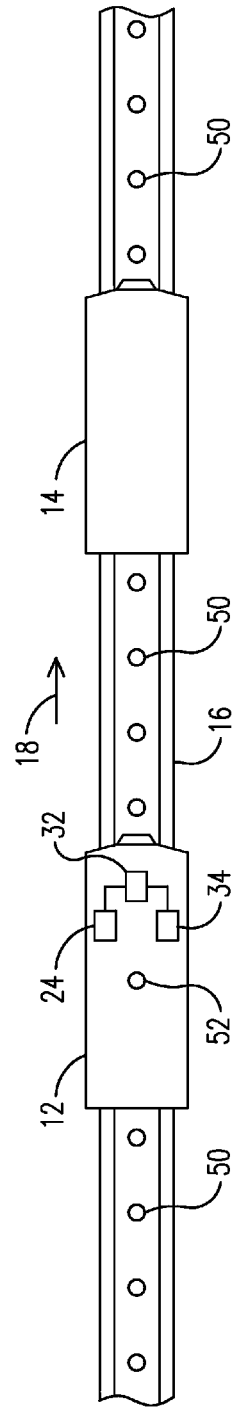
FIG. 2 is a schematic diagram of remote and lead unit of a distributed power train and designated geographic coordinates of a railroad track.

With respect to FIG. 2, there is a schematic illustration of the remote unit 12 traveling on the track 16 in the direction indicated by the arrow 18. The points 50 on the track 16 represent geographical coordinates plotted for the track 16 to develop the track profile. The point 52 represents the geographical coordinates of the remote unit 12 at a time that the controller 32 on the remote unit 12 has determined that there is a communication loss between the remote unit 12 and the lead unit 14.

The throttle positions for the geographical coordinates or ranges of geographical coordinates are dependant on the track grade and the direction in which the remote unit 12 is moving on the track 16. Accordingly, the database 24 may have data relative to a track grade associated with each geographical coordinate or with each range of geographical coordinates, and, for each track grade or range of track grades there may be at least one associated notch setting. The throttle position data may comprise more than a single throttle position associated with the geographical coordinates or range of coordinates. For example, when the remote unit 12 is traveling in one direction, e.g. uphill, the track grade may be significantly different than the grade when the remote unit 12 is traveling in the opposite direction on the track 16 e.g. downhill. Accordingly, two or more throttle positions may be associated with a single geographical coordinate or range of coordinates. Therefore, the controller 32 may be configured to determine the direction in which the remote unit 12 is traveling in order to select the appropriate throttle position associated with the geographical coordinates or range of coordinates of the track 16, track grade or direction of movement of the remote unit 12.

Other data such as data relative to speed restrictions on the track and the distance the lead unit 14 is spaced from the remote unit 12 may be factored in determining the notch settings. In addition, the data relative to the throttle positions may be tailored for individual locomotives so that throttle positions may be associated with a particular remote unit. The data may also be grouped according to classes of vehicles. For example, remote units that may be classified according to similar characteristics such as engine size (2000, hp, 4400 hp and 6000 hp) and/or locomotive weight; and, for each class of like units there may be associated throttle positions.

The controller 32 or the database 24 for the remote unit 12 may be configured to provide the track profile data including the throttle positions or track grade data in the form of a look up table. That is, once the controller 32 determines there is a communication loss and receives the geographical coordinates 52 of the remote unit 12 and data relative to the direction of movement of the remote unit 12 from the GPS transceiver 34, the controller 32 may be configured to access the database 24 to identify the next geographical coordinate 50 plotted for the track profile in the direction (represented by arrow 18) of movement of the remote unit 12, and identify the associated throttle position. With respect to FIG. 2, where there are large number of geographical data points 50 that are spaced apart in smaller increments for example in fractions of a mile, selecting the next geographical data point 50 may be a relatively safe prediction of the predicted throttle position for the remote unit 12. However, if fewer geographical data points 50 are provided and are spaced at greater mileage increments, the controller 32 may be configured to select the closest geographical coordinate data 50, which may be in the same or opposite direction relative to the movement of the remote unit 12 represented by arrow 18.

Figure 3:
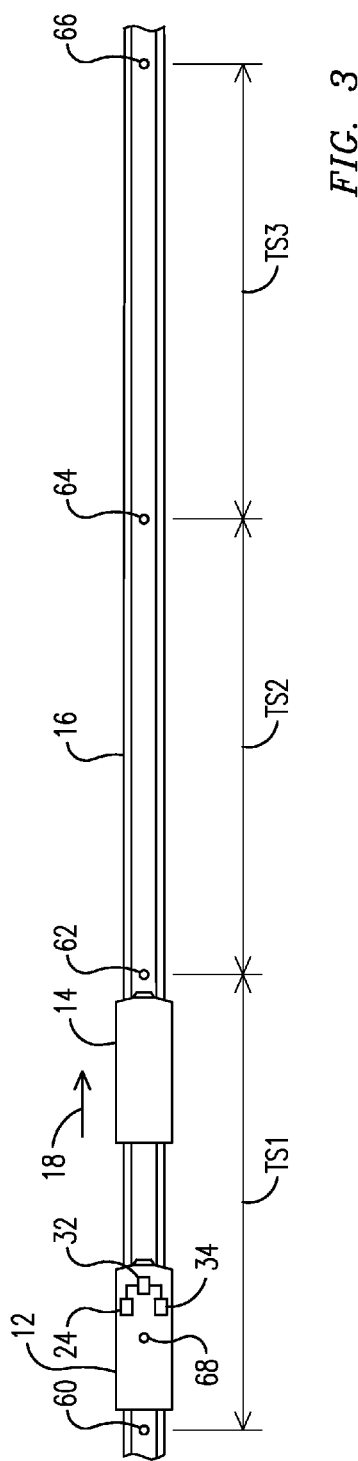
FIG. 3 is a schematic diagram of remote and lead unit of a distributed power train and designated geographic coordinates of track segments of the railroad track.

With respect to FIG. 3, there is schematically illustrated the remote unit 12 traveling on a track 16, and a track profile is divided into track segment TS1, TS2 and TS3. Presently, train and locomotive operators may develop or formulate a trip plan for the train that includes the control of the lead locomotive unit and remote units during the course of a trip from a start location to a destination. The operator typically relies on passed experience, training and factoring the above-referenced parameters such as track grade, distance between the lead and remote units, speed restrictions etc. to develop the trip plan. The trip plan may include one or more track segments between the start location and destination and, for each track segment, there is identified one or more throttle positions for the lead unit and the remote unit. For example, for a trip plan of fifty miles the planned speed for both the lead and remote units may be 40 mph (64.37 kilometers/hour) for the first 20 miles (32.19 kilometers); 50 mph (80.47 kilometers/hour) for the next 20 miles (32.19 kilometers); 35 mph (56.33 kilometers/hour) for the next 10 miles (16.09 kilometers); and, then 20 mph (32.19 kilometers/hour) for the last 5 miles (8.047 kilometers) of the trip plan. The operator controls the movement and speed of the lead locomotive by manually operating the throttle and/or brake handles; and, signals sent via the communication system of the distributed power train to control the remote unit.

In an embodiment of the invention the controller 32 on the remote unit 12 may have a database or memory that comprises data relative to a trip plan that includes the geographical coordinates of a start location of the lead locomotive and/or geographical coordinates of a destination location for the train. In addition, the memory or database includes identity of one or more track segments in the trip plane and for each track segment there is a predetermined speed setting or planned speed for the lead unit 14 and remote unit.

With respect to FIG. 3, there is schematically a track profile that includes a plurality of track segments TS1-TS3. The memory or database includes plurality of geographical coordinate points 60, 62, 64 and 66 associated with or defining entry/exit points of the track segments TS1-TS3. The database 24 includes data relative to at least one throttle position that is associated each track segment TS1-TS3. As described above, the throttle position for the remote unit 12 is dependant upon the track grade for each track segment TS1-TS3, so the database 24 may also include date relative to the track grade for each track segment TS1-TS3. In addition, the throttle position data may comprise more than a single throttle position associated with the geographic coordinates, range of coordinates or track segments TS1-TS3. For example, when the remote unit 12 is traveling in one direction, e.g. uphill, the track grade may be significantly different than the grade when the remote unit 12 is traveling in the opposite direction on the track 16 e.g. downhill. Accordingly, two or more throttle positions may be associated with a single geographical coordinate, range of coordinates or track segments. Therefore, the controller 32 may be configured to determine the direction in which the remote unit 12 is traveling in order to select the notch setting associated with the geographical coordinates or range of coordinates of the track 12.

In operation and with respect to FIGS. 1 and 3, the GPS transceiver 34 transmits the geographic coordinates 68 of the remote unit 12 to its controller 32. When the controller 32 determines that a communication loss exists between the lead unit 14 and the remote unit 12, the controller 32 is configured or programmed to identify the track segment or segments on which the remote unit 12 is traveling. This can be done because the database includes data relative to the geographical coordinates relative to entry/exit points 60, 62, 64 and 66 for each of the track segments TS1-TS3.

By way of example and in reference to FIG. 3, there is the lead unit 14 and remote unit 12 traveling on track segment TS1. The GPS transceiver 34 transmits geographical coordinates 68 of the remote unit 12 to the controller 32, which determines the direction (indicated by arrow 18) of travel of the remote unit 12. The controller 32 then identifies the next geographical coordinate data point 62, which indicates that the remote unit 12 is on TS1 considering the direction of travel of the remote unit 12. The controller 32 then is able to identify a planned throttle position associated with the TS1 and the direction of travel of the remote locomotive. If a communication loss has been detected, the controller 32 then compares the planned throttle position with the current operating position to determine if the throttle position should be changed or maintained and issues one or more commands accordingly.

While the above-described embodiments of the invention have been discussed in terms of throttle position, or changing throttle positions, the invention is also operable for issuing brake commands or changing between braking and tractive effort commands. In current distributed power trains, if the last communicated command from the lead unit to a remote unit is a brake command and there is a communication loss, the remote unit will continue to implement the brake command, which proves to be an inefficient operation if the train, including the remote unit, begins to travel uphill. In embodiments of the invention, the controller 32 is able to determine the appropriate command to increase power and change the throttle position or issue braking commands, because the controller 32 can determine a location of the remote unit 12 on the track 16 and determine the appropriate throttle position or braking dynamic associated with location of the remote unit 12 on the track 16.

As shown in FIG. 1, an embodiment of the invention may comprise a sensor 40 as a component of the brake control system at the remote unit 12 to monitor the fluid pressure in the brake pipe line 22 at the remote unit 12. The sensor 40 transmits signals to the controller 32 or brake controller 38 indicative of the fluid pressure in the brake pipe 22. Data relative to a pressure limit or a brake pipe pressure that is indicative of a brake command at the lead unit 14 is provided. In this manner, in the event there is a communication loss between the remote unit 12 and lead unit 14, and the sensor 40 detects a drop in brake pipe 22 pressure indicative of a brake command issued from the lead unit 14, the remote unit 12 may initiate the brake command.

Figure 4:
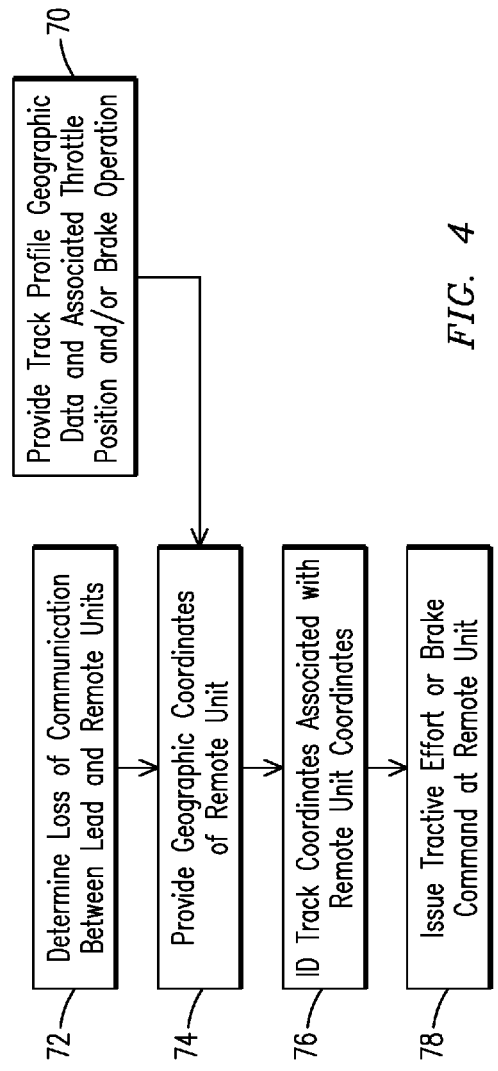
FIG. 4 is a flow chart describing steps to an embodiment of the invention

With respect to FIG. 4, there is shown a flow chart describing steps to method for the invention. In step 70, data relative a track profile including data relative to geographic coordinates or ranges of coordinates for the track 16 and data relative to one or more throttle positions or brake operations associates with each coordinate or range coordinates is stored in a memory or database. In addition, the throttle position and brake operation data may be associated with a direction of movement of the remote unit 12. In step 72, the remote unit 12 has determined that communication the lead unit 14 has been lost or interrupted. In step 74, the geographic coordinates and direction of movement the remote unit 12 is provided. In step 76, the controller 32 at the remote unit 12, identifies track a geographic coordinate or range of coordinates associated with the remote unit 12 coordinates; and, in step 78 the controller 32 issues a tractive effort or brake command that is associated with the identified track coordinates or range of coordinates. In this manner, the remote unit 12 is able to predict an appropriate operation that is consistent with the operation of the lead unit 14 for a more efficient operation on the track 16.

While the preferred embodiments of the present invention have been shown and described herein, it will be obvious that such embodiments are provided by way of example only and not of limitation. Numerous variations, changes and substitutions will occur to those skilled in the art without departing from the teaching of the present invention. Accordingly, it is intended that the invention be interpreted within the full spirit and scope of the appended claims.

Embodiments described above may be implemented on a suitable computer system, controller, memory, or generally a computer readable medium. For example, the steps of the methods described above may correspond to computer instructions, logic, software code, or other computer modules disposed on the computer readable medium, e.g., floppy disc, hard drive, ASIC, remote storage, optical disc, or the like. The computer-implemented methods and/or computer code may be programmed into an electronic control unit of an engine, a main control system of the locomotive, a remote control station that communicates with the locomotive unit, or the like, as described above.

What is claimed is:

1. A system comprising:
a controller configured to issue commands to control operation of a remote powered unit of a powered vehicle system based on a trip plan that dictates one or more operations of the powered vehicle system as the powered vehicle system travels along a route, the controller further configured to determine a location of the remote powered unit along the route in response to an identified communications loss between the remote powered unit and a lead powered unit of the powered vehicle system, wherein the controller is configured to determine a designated operation of the remote powered unit that is associated with the location of the remote powered unit in the trip plan and to control operation of the remote powered unit based on the designated operation when the communications loss is identified.

2. The system of claim 1, further comprising a transceiver configured to communicate the location of the remote powered unit to the controller.

3. The system of claim 1, wherein the trip plan includes grade data associated with one or more segments of a trip of the powered vehicle system along the route.

4. The system of claim 1, wherein the trip plan includes different designated operations for the remote powered unit based on a direction of movement on the route of the remote powered unit.

5. The system of claim 1, wherein the controller is configured to determine the designated operation for the remote powered unit from the trip plan based on a separation distance between the lead powered unit and the remote powered unit.

6. The system of claim 1, wherein the controller is configured to refer to a memory storing one or more constraints on travel along the route to determine the designated operation for the remote powered unit.

7. The system of claim 1, wherein the controller is configured to permit the lead powered unit to control the operation of the remote powered unit at least one of before or after the communications loss is identified.

8. The system of claim 1, wherein the controller is configured to control a throttle position of the remote powered unit based on the designated operation in response to the communications loss that is identified.

9. The system of claim 1, wherein the controller is configured to be communicatively coupled with a sensor that monitors brake pressure of the remote powered unit, and the controller is configured to control operation of one or more brakes of the powered vehicle system when the sensor detects a change in the brake pressure that is monitored.

10. The system of claim 1, wherein the trip plan includes one or more throttle settings or brake settings associated with different locations of the remote powered unit along the route, and the controller is configured to determine the designated operation from the one or more throttle settings or brake settings.

11. The system of claim 1, further comprising the remote powered unit and the lead powered unit, wherein the lead powered unit controls one or more operations of the remote powered unit prior to the communications loss that is identified.

12. A system comprising:
a controller configured to be disposed on-board a remote powered unit of a powered vehicle system and to issue commands to control operation of the remote powered unit, the controller also configured to determine a location of the remote powered unit along a route being traveled by the powered vehicle system and to determine an operation of the remote powered unit from a trip plan of the powered vehicle system and based on the location of the remote powered unit, wherein the controller is configured to take over control of the operation of the remote powered unit from the lead powered unit and to implement the operation determined from the trip plan in response to identification of a communications loss between the lead powered unit and the remote powered unit.

13. The system of claim 12, wherein the trip plan includes designated operations of the powered vehicle system based on the location of the powered vehicle system along the route.

14. The system of claim 12, wherein the controller is configured to receive directional data that indicates a direction of movement of the remote powered unit along the route, the controller also configured to determine which of a plurality of designated operations of the trip plan to implement based on the directional data.

15. The system of claim 12, further comprising the remote powered unit and the lead powered unit, wherein the lead powered unit controls one or more operations of the remote powered unit prior to the communications loss that is identified.

16. A method comprising:
identifying a communications loss between a remote powered unit and a lead powered unit of a power vehicle system;
determining a location of the remote powered unit after the communications loss is identified;
identifying an operation of the remote powered unit from a trip plan that includes designated operations for the powered vehicle system as the powered vehicle system travels along the route, the operation that is identified being associated with the location of the remote powered unit that is determined; and
issuing a command to implement the operation of the remote powered unit.

17. The method of claim 16, wherein the operation that is identified from the trip plan based on the location of the remote powered unit includes at least one of a throttle setting or a brake setting of the remote powered unit.

18. The method of claim 16, wherein identifying the operation includes selecting at least one of a plurality of different operations associated with a plurality of different locations from the trip plan.

19. The method of claim 16, wherein identifying the operation includes selecting the operation based on a direction of movement of the powered vehicle system along the route.

20. The method of claim 16, wherein the trip plan includes different operations associated with different directions of movement of the powered vehicle system.

21. The method of claim 16, wherein the lead powered unit controls the operation of the remote powered unit at least one of before or after the communications loss is identified.

22. The method of claim 16, further comprising receiving the location of the remote powered unit from a global positioning system.

23. A method comprising:
controlling one or more operations of a remote powered unit of a powered vehicle system from a lead powered unit of the powered vehicle system as the powered vehicle system travels along a route according to a trip plan, the trip plan including one or more designated operations of the powered vehicle system;
identifying a communications loss between the lead powered unit and the remote powered unit, the communications loss preventing the lead powered unit from controlling the one or more operations of the remote powered unit;
determining a location of the remote powered unit along the route; and
issuing a command to control the one or more operations of the remote powered unit in response to the communications loss that is identified, the command based on one or more designated operations of the trip plan and on the location of the remote powered unit.

24. The method of claim 23, wherein the designated operations of the trip plan include at least one of throttle settings or brake settings of the remote powered unit.

25. The method of claim 23, further comprising monitoring pressure associated with a brake of the powered vehicle system in response to identifying the communications loss, wherein issuing the command includes issuing a brake-operation command when the pressure associated with the brake decreases.

26. The method of claim 23, wherein the trip plan includes the one or more designated operations being associated with different locations of the remote powered unit, and wherein issuing the command includes selecting at least of the one or more designated operations based on the location of the remote powered unit when the communications loss is identified.

27. A method comprising:
identifying a communications loss between a remote powered unit and a lead powered unit of a powered vehicle system, the lead powered unit controlling one or more operations of the remote powered unit prior to the communications loss that is identified;
determining at least one of a location or a direction of movement of the remote powered unit;
selecting a designated operation from a trip plan based on the at least one of the location or the direction of movement, the trip plan including a plurality of the designated operations associated with a plurality of different locations or a plurality of different directions of movement as the powered vehicle system travels along a route; and
issuing at least one command to control movement of the remote powered unit during the communications loss, said at least one command based on the designated operation that is selected from the trip plan.

* * * * *